(12) United States Patent
Höfig et al.

(10) Patent No.: US 12,210,333 B2
(45) Date of Patent: Jan. 28, 2025

(54) METHOD AND SYSTEM FOR DETERMINING MACHINE SAFETY AND PRODUCT QUALITY FOR A FLEXIBLE CYBER-PHYSICAL PRODUCTION SYSTEM

(71) Applicant: Siemens Aktiengesellschaft, Munich (DE)

(72) Inventors: Kai Höfig, Rohrdorf (DE); Chee-Hung Koo, Stuttgart (DE); Stefan Rothbauer, Augsburg (DE); Marian Marcel Vorderer, Rutesheim (DE); Marc Zeller, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 649 days.

(21) Appl. No.: 17/435,076

(22) PCT Filed: Feb. 20, 2020

(86) PCT No.: PCT/EP2020/054526
§ 371 (c)(1),
(2) Date: Aug. 31, 2021

(87) PCT Pub. No.: WO2020/178039
PCT Pub. Date: Sep. 10, 2020

(65) Prior Publication Data
US 2022/0137589 A1 May 5, 2022

(30) Foreign Application Priority Data
Mar. 1, 2019 (EP) ..................................... 19160262

(51) Int. Cl.
*G05B 19/406* (2006.01)

(52) U.S. Cl.
CPC ...................... *G05B 19/406* (2013.01); *G05B 2219/50193* (2013.01)

(58) Field of Classification Search
CPC ........ G05B 19/406; G05B 2219/50193; G05B 19/41885; G05B 23/0294; G05B 19/41845; Y02P 90/02
See application file for complete search history.

(56) References Cited

U.S. PATENT DOCUMENTS

2003/0004765 A1* 1/2003 Wiegand ................ G06Q 10/06
702/184
2009/0204234 A1* 8/2009 Sustaeta ............. G05B 13/0265
700/29
(Continued)

FOREIGN PATENT DOCUMENTS

EP 3156868 A1 4/2017
EP 3410384 A1 12/2018

OTHER PUBLICATIONS

International Search Report and Written Opinion in corresponding PCT Patent Application No. PCT/EP2020/054526 dated Jun. 2, 2020. 13 pages.
(Continued)

*Primary Examiner* — Christopher E. Everett
(74) *Attorney, Agent, or Firm* — Schmeiser, Olsen & Watts LLP

(57) ABSTRACT

A computer-implemented method for determining automatically a machine safety and/or a product quality of a flexible cyber-physical production system with a configuration adaptable during a production process including production steps executed by machines forming equipment of a physical factory of the cyber-physical production system to produce a product according to a product recipe, wherein the machine safety and/or product quality are calculated during runtime of the flexible cyber-physical production system by
(Continued)

processing a meta-model of the flexible cyber-physical production system stored in a computer readable storage medium, is provided.

16 Claims, 3 Drawing Sheets

(56) References Cited

U.S. PATENT DOCUMENTS

| | | | |
|---|---|---|---|
| 2015/0269013 A1* | 9/2015 | Höfig | G06Q 10/101 |
| | | | 714/37 |
| 2017/0091791 A1* | 3/2017 | Srinivasan | G06N 5/04 |
| 2017/0227954 A1* | 8/2017 | Seki | G05B 13/041 |
| 2018/0210436 A1* | 7/2018 | Burd | G05B 23/0294 |
| 2020/0012265 A1* | 1/2020 | Thomsen | G06F 3/0481 |

OTHER PUBLICATIONS

Extended European Search Report in corresponding European Patent Application No. 19160262.2 dated Sep. 13, 2019. 7 pages.

* cited by examiner

METHOD AND SYSTEM FOR DETERMINING MACHINE SAFETY AND PRODUCT QUALITY FOR A FLEXIBLE CYBER-PHYSICAL PRODUCTION SYSTEM

CROSS-REFERENCE TO RELATED APPLICATIONS

This application is a national stage entry of PCT Application No. PCT/EP2020/054526 having a filing date of Feb. 20, 2020, which claims priority to European Patent Application No. 19160262.2, having a filing date of Mar. 1, 2019, the entire contents of which are hereby incorporated by reference.

FIELD OF TECHNOLOGY

The following relates to a method and system for determining automatically machine safety characteristics and/or product quality characteristics provided by a flexible cyber-physical production system.

BACKGROUND

A major trend in the manufacturing sector is the growing individualization of products and the volatility of product mixes. Flexible production systems can be used to produce small batches or lots of the same product. A cyber-physical production system can be used to produce even lot-size-1 batches or individual products on demand. In order to reach this goal, a conventional concept of flexible manufacturing systems FMS which can change their software during runtime can be used. Reconfigurable manufacturing systems RMS can adapt their software as well as their hardware. Moreover, standalone production systems from different manufacturers can be interconnected to accomplish a common production goal where the production process can be orchestrated automatically in so-called plug-and-produce scenarios.

Due to frequent changes of the products being manufactured by the production system, a rapid adjustment of a factory of the production system poses a challenge to implement application scenarios of flexible production systems, also called Industry 4.0 production systems or cyber-physical production systems. Although the high flexibility of these production systems promise a faster adaption and responsiveness, it raises at the same time safety-related concerns due to unknown configurations of the production system during runtime It might not be possible to change a system if safety is not guaranteed. Also for some products, where quality is an important factor, a new configuration must ensure product quality. Missing product quality can lead to unsafe products or products that do not meet their requirements. Thus, apart from the functional aspect, the safety aspect as well as product quality assuring aspects must be addressed.

SUMMARY

Accordingly, it is an aspect of the present invention to provide a method and system which addresses both safety aspects as well as product quality assuring aspects for a flexible cyber-physical production system.

The embodiment of the present invention provides according to the first aspect a computer-implemented method for determining automatically machine safety characteristics and/or product quality characteristics of a flexible cyber-physical production system with a configuration being adaptable during a production process including production steps executed by machines forming equipment of a physical factory of said cyber-physical production system to produce a product according to a product recipe, wherein the machine safety characteristics and/or product quality characteristics are calculated during runtime by a processor of said flexible cyber-physical production system by processing an instantiated meta-model of said flexible production system stored in a computer readable storage medium.

In a possible embodiment of the computer-implemented method according to the first aspect of the present invention, the meta-model of said flexible production system includes several interlinked model categories.

This embodiment provides the advantage that different model categories can be managed by different category owners wherein each category owner is best acquainted with the technical details concerning the relative model category. Accordingly, the quality of the interlinked model categories and the total meta-model can be increased. This in turn provides for reliable and precise machine safety characteristics and product quality characteristics calculated by the computer-implemented method.

In a possible embodiment of the computer-implemented method according to the first aspect of the present invention, the meta-model comprises a production process category adapted to model the production process.

This embodiment has the advantage that the production process category can model a generic production process and can be executed by different kinds of physical factories for different products according to different product recipes of different product owners. Further, the production process category within the meta-model can be updated by the production process category owner providing for an accurate and reliable description of the respective production process.

In a further possible embodiment of the computer-implemented method according to the first aspect of the present invention, the meta-model comprises a product category adapted to model the product produced by the production process.

This embodiment has the advantage that the product category can be instantiated and updated by a product category owner having knowledge about the respective product so that the product to be produced by the production process can be specified precisely including also possible recipes failure modes.

In a further possible embodiment of the computer-implemented method according to the first aspect of the present invention, the meta-model comprises a factory category adapted to model the equipment of the physical factory.

This embodiment has the advantage that the factory category of the meta-model can be instantiated and updated by a factory owner having knowledge about the details of the factory and its equipment to provide a precise and reliable description of the factory and its equipment as well as of possible equipment failure modes.

In a further possible embodiment of the computer-implemented method according to the first aspect of the present invention, the meta-model comprises an abstract factory category adapted to model common factory specifications across any factory used in a flexible production system.

This embodiment has the advantage that the meta-model is not restricted to a single physical factory and can be applied to any kind of factory defined by the factory category increasing the range of use cases for the computer-implemented method.

In a further possible embodiment of the computer-implemented method according to the first aspect of the present invention, the meta-model comprises a safety approval category adapted to model a specific production scenario.

This embodiment has the advantage that a safety improvement process can be performed automatically and that a safety approval can be issued by the computer-implemented method of automatically for the respective production process.

In a further possible embodiment of the computer-implemented method according to the first aspect of the present invention, the meta-model comprises a safety assessment category to model a failure behaviour of a physical factory.

This embodiment has the advantage that safety functions with different performance levels can be taken into account when calculating the safety characteristics or product quality characteristics of the cyber-physical production system.

In a further possible embodiment of the computer-implemented method according to the first aspect of the present invention, at least some of the model categories of the meta-model comprise failure modes adapted to model failures of elements modeled by the respective model categories.

This embodiment has the advantage that occurring failure modes can be taken into account when calculating the machine safety and/or product quality characteristics of the flexible cyber physical production system.

In a further possible embodiment of the computer-implemented method according to the first aspect of the present invention, the failure modes of the meta-model are specified by their respective severity, occurrence and detection chance.

This embodiment has the advantage that the specified failure modes can be defined accurately.

In a further possible embodiment of the computer-implemented method according to the first aspect of the present invention, model elements of categories of the meta-model are instantiated and/or updated by associated responsible category owners.

This embodiment provides the advantage that different category owner can instantiate and/or update their respective associated model categories which can be linked to a common meta-model. This increases the reliability of the meta-model and preserves privacy and secrecy on specific knowledge against competitors or third parties participating in the use of the computer-implemented method according to the present invention.

In a further possible embodiment of the computer-implemented method according to the first aspect of the present invention, during runtime of the flexible cyber-physical production system, a safety risk assessment result of the flexible cyber-physical production system is calculated.

This embodiment provides the advantage that a controller can react immediately to the calculated safety risk assessment result to prevent any critical situations during the production process.

In a further possible embodiment of the computer-implemented method according to the first aspect of the present invention, actions are triggered automatically depending on the calculated safety risk assessment result.

This embodiment has the advantage that automatically triggered actions can prevent any critical situation in the cyber physical production system.

In a further possible embodiment of the computer-implemented method according to the first aspect of the present invention, at least some of the failure modes specified in said meta-model are monitored by sensors implemented in the physical factory of said cyber-physical production system.

This embodiment has the advantage that failure modes occurring in the cyber physical production system can be detected immediately during runtime of the system.

The embodiment of the present invention provides according to the second aspect a cyber-physical production system comprising a physical factory having an equipment with machines adapted to execute process steps of a production process to produce a product according to a predefined product recipe, wherein the cyber-physical production system is reconfigurable during the production process, wherein said cyber-physical production system is connected to a processing unit adapted to calculate automatically during runtime of said cyber-physical production system machine safety characteristics and/or product quality characteristics by processing an instantiated meta-model of said cyber-physical production system stored in a computer-readable storage medium.

BRIEF DESCRIPTION

Some of the embodiments will be described in detail, with reference to the following figures, wherein like designations denote like members, wherein.

DETAILED DESCRIPTION

Figure 1:
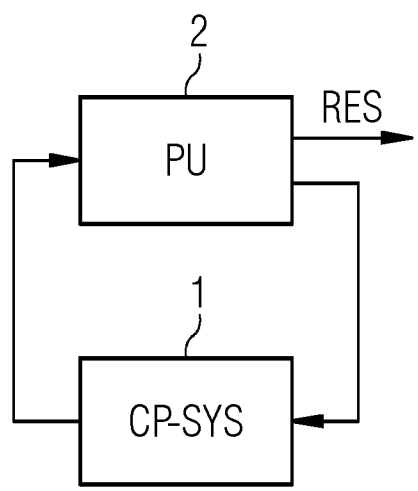
FIG. 1 depicts a block diagram for illustrating a cyber-physical production system according to embodiments of the present invention using a computer-implemented method for determining automatically machine safety and/or product quality of the cyber-physical production system.

FIG. 1 shows schematically a cyber-physical production system 1 in a loop with a processing unit 2 having a processor adapted to perform a computer-implemented method according to the first aspect of the present invention.

A cyber-physical production system 1 is a computer implemented mechanism that is controlled or monitored by computer-based algorithms and is integrated with the Internet and its users. In cyber-physical systems, physical and software components are intertwined, wherein the components are operating on different spatial and temporal scales, exhibiting multiple and distinct behavioral modalities and can interact with each other in different ways that change depending on the technical context.

A cyber-physical production system comprises collaborating computational entities, in particular machines, which are in intensive connection with the surrounding physical world and its on-going processes, providing and using, at the same time, data-accessing and data-processing services available on the internet.

The computer-implemented method executed on the processing unit 2 as shown in FIG. 1 determines automatically machine safety characteristics and/or product quality characteristics for the flexible cyber-physical production system 1. The processing unit 2 comprises data and control interfaces with machines and/or other collaborating computational entities of the cyber-physical system 2. The processing unit 2 comprises an internal data and control bus connecting the interfaces with an internal data memory and one or more internal processors or controllers adapted to perform processing of an instantiated meta model MM of the cyber physical production system 1 stored in the internal memory, in real time during operation of the cyber physical production system, i.e. during production of the product according to the product recipe. The internal memory of the processing unit 2 can comprise e.g. a DRAM memory. The calculated machine safety characteristics and product quality characteristics are output via a data interface for further processing and/or to be displayed on a display unit. The machine safety characteristics can comprise metrics indicating risks that predetermined safety requirements and/or safety standards are not met. The product quality characteristics can comprise metrics indicating or representing risks that quality standards and/or quality goals are not reached. The cyber-physical production system 1 is flexible during a manufacturing process, i.e. during its runtime. The flexible cyber-physical production system 1 comprises an adaptable configuration which can be changed during the production process performed by the production system. The production process is executed by machines of the cyber-physical production system 1. The machines form equipment of a physical factory of the cyber-physical production system 1. The physical factory is adapted to produce a product according to a product recipe which can be defined by a product owner. The machine safety and/or product quality characteristics are calculated during runtime of the flexible cyber-physical production system 1 by a processor of the processing unit 2. The processor of the processing unit 2 is adapted to process an instantiated meta-model MM of the flexible production system 1 stored in a computer readable storage medium.

A meta-model is itself a model that is used to describe another model using a modeling language. Meta-modeling is the process of generating such meta-models MM. Thus meta-modeling or meta-modeling includes the analysis, construction and development of the frames, rules, constraints, and applicable models.

The computer readable storage medium can comprise a memory to which the processor of the processing unit 2 has access. The memory can be a central database or a distributed memory depending on the use case. The processor calculates as a result machine safety characteristics of the cyber-physical system 1 and/or product quality characteristics of a product produced by the cyber-physical production system 1. The computer-implemented method executed by the processor of the processing unit 2 provides the acquisition of safety-related information from each individual production step of the production process and can in a possible embodiment perform an analysis of possible emergent hazards in an automated way to quickly assess a new configuration within a manufacturing physical factory of the cyber-physical production system 1. To evaluate the quality of the product regarding the production process, the processing unit 2 can perform in a possible embodiment a process failure mode and effect analysis on the basis of the stored meta-model MM. Every process step of a production process can negatively influence the quality of the manufactured product depending on a negative outcome of the respective process step. The process-FMEA performed by the processor of the processing unit 2 can capture possible failure modes FM of a process step and can also define measures to detect unwanted quality effects. Such an FME analysis can be used to document the applied quality measures and to find out where drawbacks in the implemented production process exist and how they can be addressed. Since in the flexible cyber-physical production system 1 the configuration of the physical factory as well as the manufactured products do constantly change in adaptable and flexible production scenarios, the process-FMEA is performed by the computer-implemented method according to the present invention dynamically during the production process of each product based on an updated new configuration. This does ensure that the requirements with respect to the quality of the production process and the resulting product can be mapped. The computer-implemented method according to the present invention provides a model-based assessment of flexible and reconfigurable manufacturing systems based on the stored meta-model MM which captures all information required to conduct both risk assessment and process-FMEA dynamically during the runtime of the production system in an automated way. The computer-implemented method enables flexible manufacturing scenarios with frequent changes of the production system up to a lot-size of one. The model-based computer-implemented method according to the present invention carries out safety analysis and/or safety assessments thus increasing the efficiency and performance of the cyber-physical production system 1 and reducing overall production costs. The computer-implemented method according to the present invention is performed during operation or runtime of the cyber-physical system 1, i.e. mostly not during a design or a development phase.

In a possible embodiment of the computer-implemented method of the present invention executed by a processor of a processing unit 2 as illustrated in FIG. 1, uses a computer readable meta-model MM of the flexible cyber-physical production system 1 including several interlinked model categories.

The meta-model MM comprises in a possible embodiment a production process category adapted to model the respective production process. The elements of the production process category address the concrete process used to produce a product. The process steps address concrete ordered actions that can be executed by machines of the physical factory to produce a product according to a product recipe. The production process category has elements which indicate how a product is produced.

In a further possible embodiment of the computer-implemented method according to the present invention, the meta-model MM comprises a product category adapted to model the product produced by the production process. The elements of the product category within the meta-model MM do address the order and steps related to what has to be done to produce the respective product.

In a further possible embodiment of the computer-implemented method, the used meta-model MM further comprises a factory category adapted to model the equipment of the physical factory. The model elements in the factory category model the concrete physical factory, its machinery, what it can do and what quality measures are in place or can be used.

The computer-implemented method according to the present invention comprises in a possible embodiment a meta-model MM which further comprises an abstract factory category adapted to model common factory specifications across any factory used in a flexible production system. The model elements of the abstract factory category within the meta-model MM can comprise common specifications of services and service parameters across any kind of physical factories. These model elements enable to specify a product independently from a concrete physical factory.

In a further possible embodiment of the computer-implemented method according to the first aspect of the present invention, the used meta model MM further comprises a safety approval category adapted to model a specific production scenario. The safety approval category comprises model elements which relate to a safety approval of a concrete production scenario to produce a product.

In a further possible embodiment of the computer-implemented method according to the first aspect of the present invention, the used meta model MM further comprises a safety assessment category to model a safety of a physical factory. In this category, the model elements of a factory and the used equipment can be linked to assess the safety of the respective factory.

The different categories of the meta-model MM allow to map different activities, use cases and roles in the domain of dynamic reconfigurable production scenarios to automatically generate a process-FMEA (quality of the product) and to generate in parallel a machine safety risk assessment result of the production system (safety of the production).

The product owner can specify what production steps in which order are required to be executed to produce a specific product according to a product recipe. The product owner can address abstract services (service declarations) to specify a production step of its product recipe. Those abstract services provide a global library of all services. Each service declaration can have constraints and parameters (service property declaration) that can be set for a recipe step, i.e. recipe service property. For example, the abstract service "drill" requires the rotation speed of the drill head and the size of the drill hole as parameters. When instantiated in a recipe step, these parameters need to be set.

For a service declaration, different failure modes FM can be stored, i.e. as failure mode declarations. Independently from service implementations (equipment service) by concrete equipment or machinery, failure modes are known in general. Failure modes comprise anti-functions or requirements not being met. There can be different types of failure modes such as full failure, partial failure, intermittent failure, degraded failure or unintentional failure. At least some of the model categories of the meta-model MM comprise failure modes FM adapted to model failures of elements modeled by the respective model categories. The failure modes FM of the meta-model MM can be specified by their severity, occurrence and detection chance. The severity assesses the impact of a failure mode (the error in the production process) with e.g. 1 representing the least safety concern and 10 representing the most dangerous safety concern. In most cases, processes with severity scores exceeding a threshold value of e.g. 8 can require a fault tree analysis FTA which estimates the probability of the failure mode FM by breaking it down into further subelements.

The occurrence of a failure mode FM assesses the chance of a failure happening with e.g. 1 representing the lowest occurrence and 10 representing the highest occurrence. For example, a score of occurrence 1 may be assigned to a failure that happens once in every five years while a score of 10 may be assigned to a failure that occurs once per hour, once per minute, etc.

The detection chance assesses the chance of a failure being detected, with e.g. 1 representing the highest chance of detection and 10 representing the lowest chance of detection.

In a possible embodiment, at least some of the failure modes specified in the instantiated meta-model MM are monitored by sensors implemented in the physical factory of the cyber-physical production system 1.

For example, the service "drill" can comprise a potential failure mode "skew drill hole" for all concrete machinery of the factory implementing this service.

For each addressed service declaration in a recipe step, the failure mode declarations are normally known to the product owner. The product owner can specify how severe the different failure modes FM are for his product using recipe failure modes. Thus, a first step of a risk assessment according to a process-FMEA can be performed with the computer-implemented method according to the present invention without knowledge about the concrete equipment that does produce the respective product.

Independently from this specification scenario of a product, the owner of a factory can model the services and safety functions of the equipment of the respective factory. Equipment services can address abstract service declarations from the common set of specified services (service declarations). Service constraints can be used to specify possible operation parameters and limitations of service property declarations. Safety functions can for example be protective measures such as light barriers that protect the personnel from interacting with the equipment of the factory.

The owner of the factory further can specify which machinery is available at the factory and which services can be provided for which parameter limitations. Furthermore, the factory owner can get a list of possible abstract failure modes (failure mode declarations) and can specify how often the abstract failure mode does occur for the concrete service (equipment failure mode). The factory owner knows his machinery, has collected data about it or the manufacturer of the machinery can provide this kind of information to the factory owner. Accordingly, the factory owner can provide information and data about the occurrence value of concrete failure modes FM when using the equipment of the physical factory.

Each production process can also include some human interaction tasks in different life cycle phases, such as a setup of equipment, interactions during the production or maintenance activities. These interactions can be specific to the process and can be independent from the product recipe. Each interaction task can include one or more hazards for the personnel involved, which have a certain level of severity. Each hazard has a probability of avoidance. Safety functions are typically in place to protect humans against a certain hazard and comprise a performance level PL requirement, which can be evaluated using the severity of the associated hazard, the frequency of the tasks and the probability of avoidance according to ISO 13849.

As a conservative combination of the probability of a hazard to be avoided, the frequency of an interaction task and the severity involved if the respective safety function for a hazard fails, a performance level PL can be calculated by using a risk graph database according to ISO 13849. The performance level PL can either comprise a required performance level gained from risk assessment or can be a provided performance level, e.g. provided from a machine vendor of a machine implemented in the physical factory. Both, the required and provided performance level PL, can be evaluated against each other and be used to approve a production process.

Since the equipment of the physical factory of the cyber-physical production system 1 is not only able to execute the production steps according to the product recipe, but is also able to execute quality measures, an equipment service can also cover certain failure modes FM. These can be of the same service, a different service of the same equipment or of a service from a different equipment. For example, a robot arm forming an equipment of a factory can be used to pick and place and can also be used to supervise its own actions using for instance a camera. In this case, the failure mode "misplacement" of the service "pick and place" may be covered by the service "camera supervision" from the same equipment, i.e. the robot arm. Using this methodology, a factory owner of the production facility can specify which machinery can be used to increase the quality of the production. Since quality measures decrease the occurrence of certain failure modes, each covered failure mode stores a decreased occurrence value.

By using the severity of a failure mode FM from the product specification (recipe failure mode) multiplied by the occurrence value of the equipment failure mode or with the decreased occurrence value of a quality measure, a process-FMEA can be conducted by the processing unit 2 of the system 1 for a product produced by a certain process on a concrete set of equipment of the physical factory.

Figure 2:
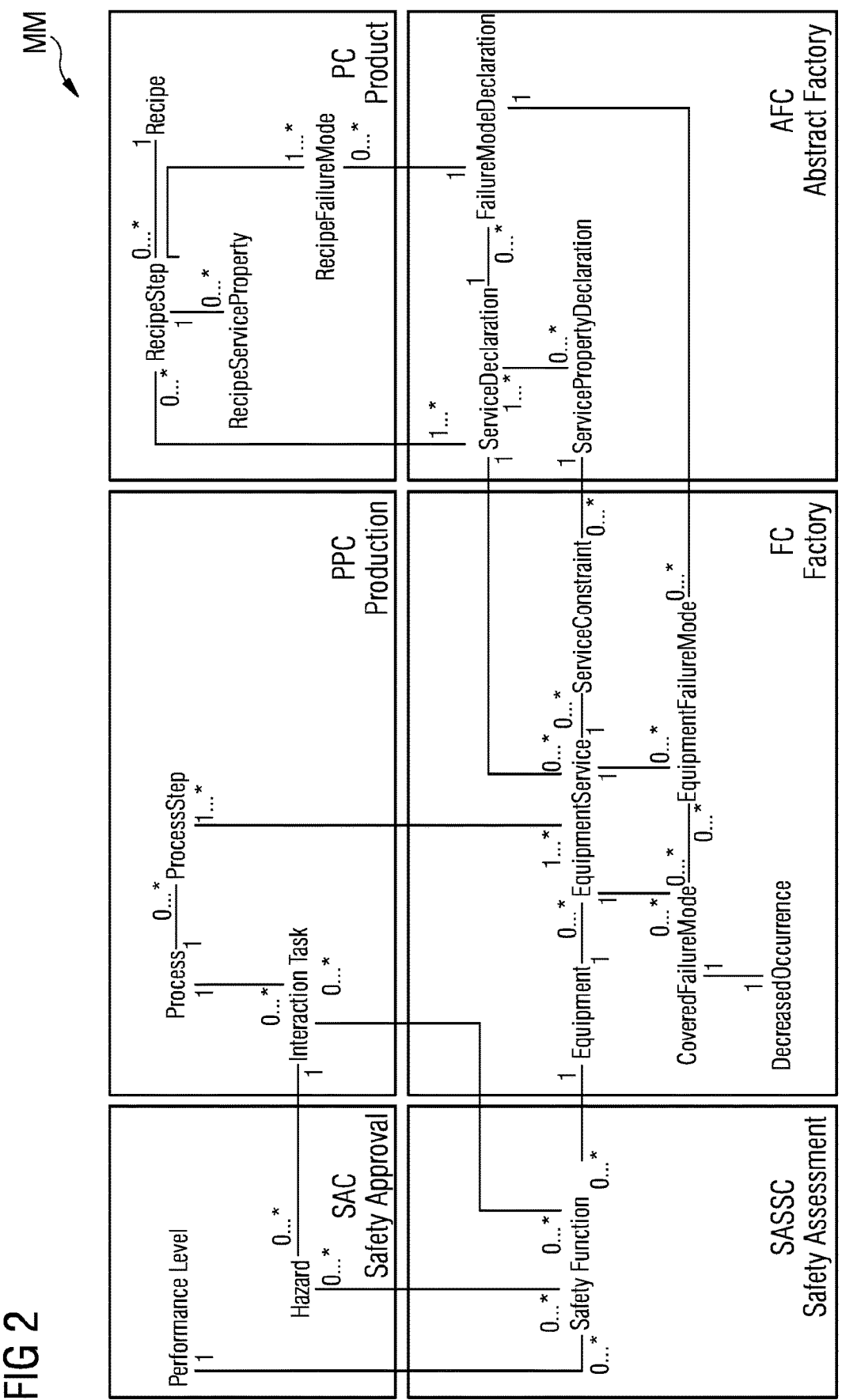
FIG. 2 depicts schematically a meta-model used by the method and system according to embodiments of the present invention.
Figure 3:
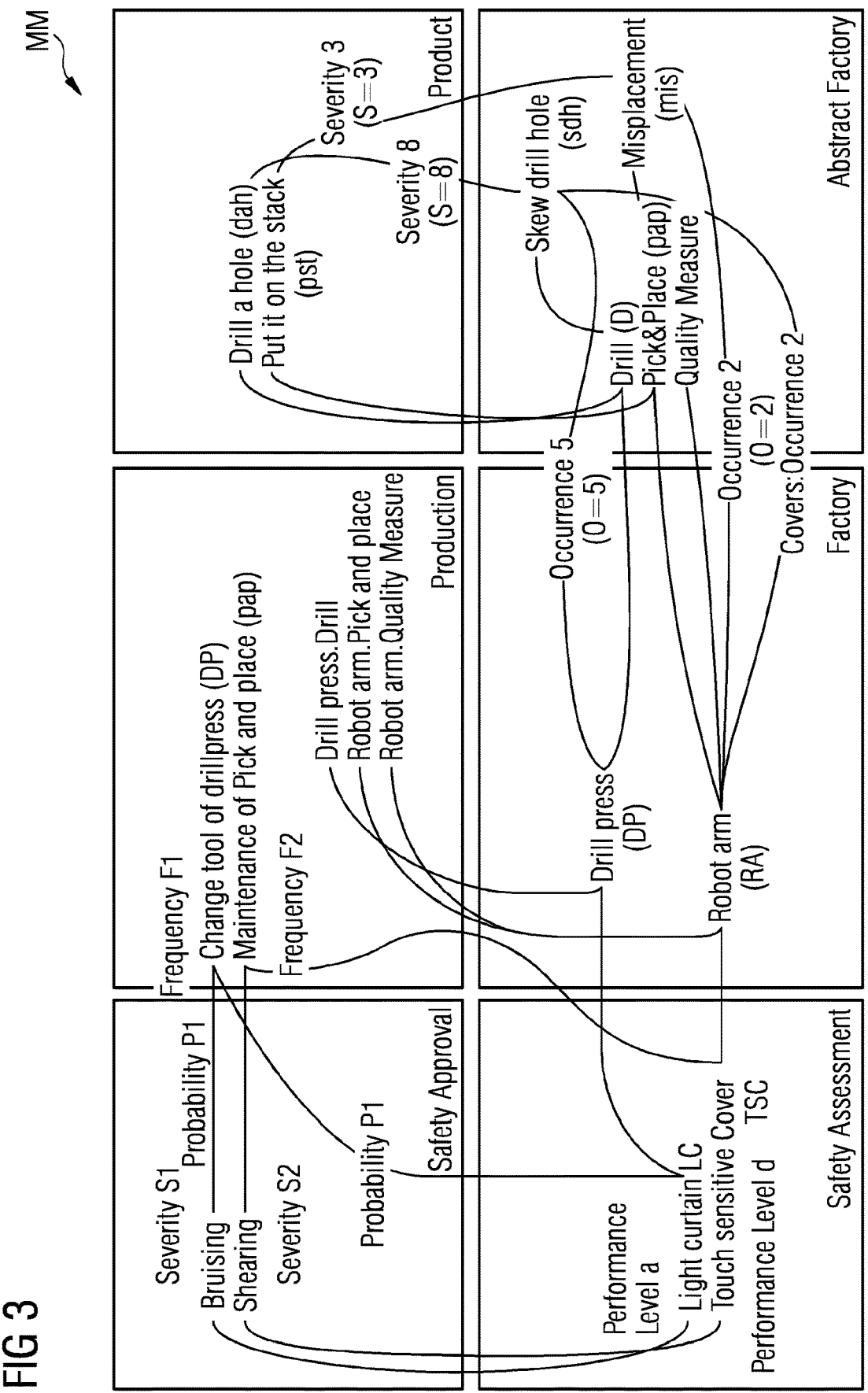
FIG. 3 depicts a schematic diagram of an exemplary product recipe and process instantiating the meta-model illustrated in FIG. 2.

FIG. 2 shows schematically a possible exemplary embodiment of a simple meta-model MM used by a method and system 1 according to the present invention. FIG. 3 illustrates an example of a product recipe and a corresponding production process that is able to produce the product with a certain quality.

As can be seen from the schematic diagram of FIG. 2, the meta-model MM used by the computer-implemented method according to the present invention can comprise several interlinked model categories MC, in particular a safety approval category SAC, a production process category PPC, a product category PC, a safety assessment category SASSC, a factory category FC and an abstract factory category AFC. FIG. 3 shows the same meta model MM instantiated for a specific use case. The meta model MM can be defined in a model description language. In a possible embodiment the meta model MM comprises an UML meta model.

In the illustrated example, the product category PC comprises two recipe steps dah, pst, i.e. "drill a hole" (dah) and "put it on the stack" (pst) that belong to a product recipe (not depicted). Each recipe step references a service declaration. Drilling has the possible failure mode of "skew drill hole" (sdh) and the service "pick and place" (pap) has the failure mode "misplacement" (mis) in the illustrated example of FIG. 3. The product owner of the product category PC has rated the failure mode "skew drill hole" (sdh) for the product recipe step "drill a hole" (dah) with a relative high severity S of eight (S=8) and misplacement (mis) for the other step with a lower severity value of three (S=3).

In a physical factory, there are in the illustrated embodiment two machines, i.e. a "drill press" (DP) implementing the service "drill" (D) and a robot arm (RA) implementing the service "pick and place" (pap). In the illustrated example, the robot arm RA forming an equipment of the physical factory additionally comprises a camera that can be used to detect the failure mode "skew drill hole" (sdh). In the illustrated example, the factory owner of the factory knows that the drill press DP forming an equipment of the factory has an occurrence of five (O=5) that it does produce skew drill holes. The camera of the robot arm RA forming also part of the factory can detect this failure mode FM and when this detection measure is used to cover the failure mode it reduces the occurrence value of the failure mode "skew drill hole" (sdh) to two (O=2).

The production process is modeled in the production category PC of the meta-model MM illustrated in FIGS. 2, 3. Risk can be expressed as a product of occurrence O and severity S. The drill press DP executes the recipe step "drill a hole" (dah) via the abstract service "drill" (D). The robot arm RA executes the recipe step "put it on the stack" (pst) via the service "pick and place" (pap). The risk of the failure mode "skew drill hole" (sdh) for the first process step is 5*8=40 (occurrence=5, severity=8), and for misplacement (mis) of the second process step, the risk is 2*3=6 (occurrence=2, severity=3). Since in the illustrated example, 40 may be an unacceptable risk, the factory executes the additional quality measure of the robot arm RA using its camera. This does reduce the risk of "skew drill hole" (sdh) in the final product to 2*8=16 which forms a risk reduction of 40−16=24.

For the risk assessment regarding the functional safety of a production process, there can be two safety functions in place. A light curtain LC can be used to protect the operator against bruising when interacting with the drill press DP and a touch sensitive cover TSC can be used in the given example as a protection against shearing when interacting with the pick and place equipment. In the exemplary production process, it may be necessary to change the tool of the drill press DP at the beginning of the production process (F2 frequency for usage) and to maintain the pick and place system (pap) from time to time (F2 usage frequency).

Since it is generally possible to avoid bruising and shearing when interacting with the machinery of the factory for trained personnel, both hazards comprise an associated probability of P1 for these tasks. Furthermore, bruising is rated to be less severe than shearing (S1 for bruising and S2 for shearing).

By having the risk evaluation results of severity S, probability P and frequency F for the specific hazards of the interaction tasks, it is required to locate safety functions with performance level a and d, respectively, to protect against these hazards. The performance levels PL can be the result of the automatically conducted risk assessment. If the required performance level PL can be provided by the safety functions installed, an automatically conducted safety approval can be issued by the processing unit 2 for the respective production process. The installed safety functions can comprise e.g. a light curtain LC or a touch sensible cover TSC.

The computer readable meta model MM as stored in distributed or central databases used by the computer-implemented method according to the present invention for machine safety and/or product quality assessment can be used for any adaptable and/or reconfigurable cyber-physical production system 1. The meta-model MM forms the basis to realize flexible production scenarios in which individual and/or customer specific productions can be manufactured up to lot-size-1. The computer-implemented method does ensure the safe operation of a new, previously unknown configuration of the production system by conducting a risk assessment in an automated way based on the information available in the stored meta-model MM. Moreover, the evaluation, if a specific product can be manufactured with the cyber-physical production system 1 while meeting the customer's quality requirements by a specific configuration of the factory, can be conducted by generating a process-FMEA in an automated way. The model-based approach provides all information to perform these assessments automatically during runtime so that previously performed manually and time-consuming tasks can be completely automated, thus enabling a fast reconfiguration of a flexible cyber-physical production system 1 in all kinds of flexible production scenarios. The computer-implemented method according to the present invention can be implemented as a software tool loadable from a database or a cloud platform.

In a possible embodiment, the stored meta-model MM can be edited by a system operator.

The meta-model MM used by the computer-implemented method according to the present invention comprises several different model categories MC wherein each model category MC can be instantiated and/or updated by an associated responsible category owner such as a product owner or a factory owner. In a possible embodiment, the different model categories MC can be instantiated and/or updated independently from the different category owners and then be linked to a common complete meta-model MM to be used during runtime of the cyber-physical manufacturing system 1. In a possible implementation, each category owner has only access to the corresponding model category MC and may not edit or change any model elements of other model categories MC not belonging to the category owner. Each category owner knows the corresponding part of the model best so that the instantiation and/or update of the respective model category MC can be performed precisely without configuration errors. The management of the access rights to the different model categories MC can be performed in a possible embodiment by using access rights given to different category owners. For instance, the owner of the product category PC may not change any settings in the factory category FC managed by the factory owner. The linking of the different parts of the meta-model MM, and/or instantiated meta model MM i.e. the different model categories MC, can be performed in a possible embodiment by a platform provider of a cloud platform.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for determining automatically machine safety characteristics and/or a product quality characteristics of a flexible cyber-physical production system with a configuration adaptable during a production process including production steps executed by machines forming equipment of a physical factory of the cyber-physical production system to produce a product according to a product recipe, the method comprising:

during a runtime of the flexible cyber-physical production system in which the product is being produced according to the product recipe during the production process, calculating, by a processing unit, the machine safety characteristics and/or the product quality characteristics by processing an instantiated meta-model of the flexible cyber-physical production system stored in a computer readable storage medium;

in response to a new configuration of the flexible cyber-physical production system, automatically processing, by the processing unit, the instantiated meta-model based on the new configuration, during the runtime of the flexible cyber-physical production system, wherein the instantiated meta-model comprises a safety approval category adapted to model a specific production scenario, the safety approval category including model elements which relate to a safety approval of a concrete production scenario to produce the product; and producing, by the machines of the physical factory, the product according to the product recipe according to the new configuration of the flexible cyber-physical production system.

2. The computer-implemented method according to claim 1 wherein the meta-model of the flexible cyber-physical production system includes several interlinked model categories.

3. The computer-implemented method according to claim 2 wherein the meta-model comprises a production process category adapted to model the production process.

4. The computer-implemented method according to claim 2, wherein the meta-model comprises a product category adapted to model the product produced by the production process.

5. The computer-implemented method according to claim 1 wherein the meta-model comprises a factory category adapted to model the equipment of the physical factory.

6. The computer-implemented method according to claim 1 wherein the meta-model comprises an abstract factory category adapted to model common factory specifications across any factory used in a flexible production system.

7. The computer-implemented method according to claim 1 wherein the meta-model comprises a safety assessment category to model a failure behavior of the physical factory.

8. The computer-implemented method according to claim 1 wherein at least some of the model categories of the meta-model comprise failure modes adapted to model failures of elements modeled by the respective model categories.

9. The computer-implemented method according to claim 8 wherein the failure modes of the meta-model are specified by respective severity, occurrence and detection chance.

10. The computer-implemented method according to claim 1 wherein the model elements of categories of the meta-model are instantiated and/or updated by associated responsible category owners.

11. The computer-implemented method according to claim 1 wherein during runtime of the flexible cyber-physical production system, a safety risk assessment result of the flexible cyber-physical production system is calculated.

12. The computer-implemented method according to claim 11 wherein actions are triggered automatically depending on the calculated safety risk assessment result.

13. The computer-implemented method according to claim 1 wherein at least some of the failure modes specified in the meta-model are monitored by sensors implemented in the physical factory of the cyber-physical production system.

14. The computer-implemented method of claim 1, wherein the processing unit is in a loop with the flexible cyber-physical production system, and the processing unit comprises data and control interfaces with machines and/or other collaborating computational entities of the flexible cyber-physical production system, and an internal data and control bus connecting the data and control interfaces with an internal data memory and one or more internal processors or controllers configured to perform processing of the instantiated meta model of the cyber physical production system stored in the internal memory.

15. A cyber-physical production system comprising a physical factory having an equipment with machines adapted to execute process steps of a production process to produce a product according to a predefined product recipe:
- wherein the cyber-physical production system is reconfigurable during the production process;
- the cyber-physical production system being connected to a processing unit adapted to, during a runtime of the cyber-physical production system in which the product is being produced according to the predefined product recipe during the production process, calculate automatically during runtime of the cyber-physical production system machine safety characteristics and/or product quality characteristics by processing an instantiated meta-model of the cyber-physical production system stored in a computer-readable storage medium;
- in response to a new configuration of the cyber-physical production system, automatically process the instantiated meta-model based on the new configuration, during the runtime of the cyber-physical production system, wherein the instantiated meta-model comprises a safety approval category adapted to model a specific production scenario, the safety approval category including model elements which relate to a safety approval of a concrete production scenario to produce the product; and
- produce, by the machines of the physical factory, the product according to the product recipe according to the new configuration of the flexible cyber-physical production system.

16. The cyber-physical production system of claim 15, wherein the processing unit is in a loop with the cyber-physical production system, and the processing unit comprises data and control interfaces with machines and/or other collaborating computational entities of the cyber-physical production system, and an internal data and control bus connecting the data and control interfaces with an internal data memory and one or more internal processors or controllers configured to perform processing of the instantiated meta model of the cyber physical production system stored in the internal memory.

* * * * *